US006628253B1

United States Patent
Hiroki

(10) Patent No.: US 6,628,253 B1
(45) Date of Patent: Sep. 30, 2003

(54) PICTURE DISPLAY DEVICE AND METHOD OF DRIVING THE SAME

(75) Inventor: Masaaki Hiroki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/192,234

(22) Filed: Nov. 16, 1998

(30) Foreign Application Priority Data

Nov. 17, 1997 (JP) .............................................. 9-332479

(51) Int. Cl.[7] .................................................. G09G 3/36
(52) U.S. Cl. ............................ 345/87; 345/96; 345/209
(58) Field of Search ............................... 345/87, 88–89, 345/90, 92, 94, 96, 98, 100, 208–209, 55; 348/744, 751, 791–792; 349/5–7; 341/150

(56) References Cited

U.S. PATENT DOCUMENTS

| | | | |
|---|---|---|---|
| 4,842,371 A | * 6/1989 | Yasuda et al. | ................. 345/96 |
| 5,598,180 A | 1/1997 | Suzuki et al. | ............... 345/100 |
| 5,604,511 A | 2/1997 | Ohi | |
| 5,790,092 A | * 8/1998 | Moriyama | .................... 345/96 |
| 5,847,688 A | 12/1998 | Ohi et al. | ..................... 345/98 |
| 6,049,321 A | * 4/2000 | Sasaki | ......................... 345/99 |
| 6,097,352 A | * 8/2000 | Zavracky et al. | ............... 345/7 |
| 6,166,725 A | * 12/2000 | Isami et al. | .................. 345/209 |

FOREIGN PATENT DOCUMENTS

| | | |
|---|---|---|
| DE | 43 06 988 A1 | 9/1993 |
| EP | 0 457 329 A2 | 11/1991 |
| EP | 0 718 816 A2 | 6/1996 |
| JP | 7-121144 | 5/1995 |
| JP | 8051584 | 2/1996 |

OTHER PUBLICATIONS

*CMOS 220 MHz True–Color Graphics Triple 10–Bit Video RAM–DAC*, ADV7150, Analog Devices, Inc., 1996, pp. 1–34.

European Search Report dated Mar. 24, 1999.

* cited by examiner

Primary Examiner—Richard Hjerpe
Assistant Examiner—Francis Nguyen
(74) Attorney, Agent, or Firm—Eric J. Robinson; Robinson Intellectual Property Law Office, P.C.

(57) ABSTRACT

In a picture display device, a picture having high gradation is obtained by using an alternating method which can deal with a video signal having a high frequency band region. On the basis of an input signal, a signal processing circuit outputs a pair of analog video signals (a signal reversal frequency is one frame), which have inversion relationships with each other, to a signal line drive circuit, and the signal line drive circuit applies one of the inputted pair of video signals to an odd signal line, and applies the other of the video signals to an even signal line, so that source line reversal drive is carried out.

18 Claims, 13 Drawing Sheets

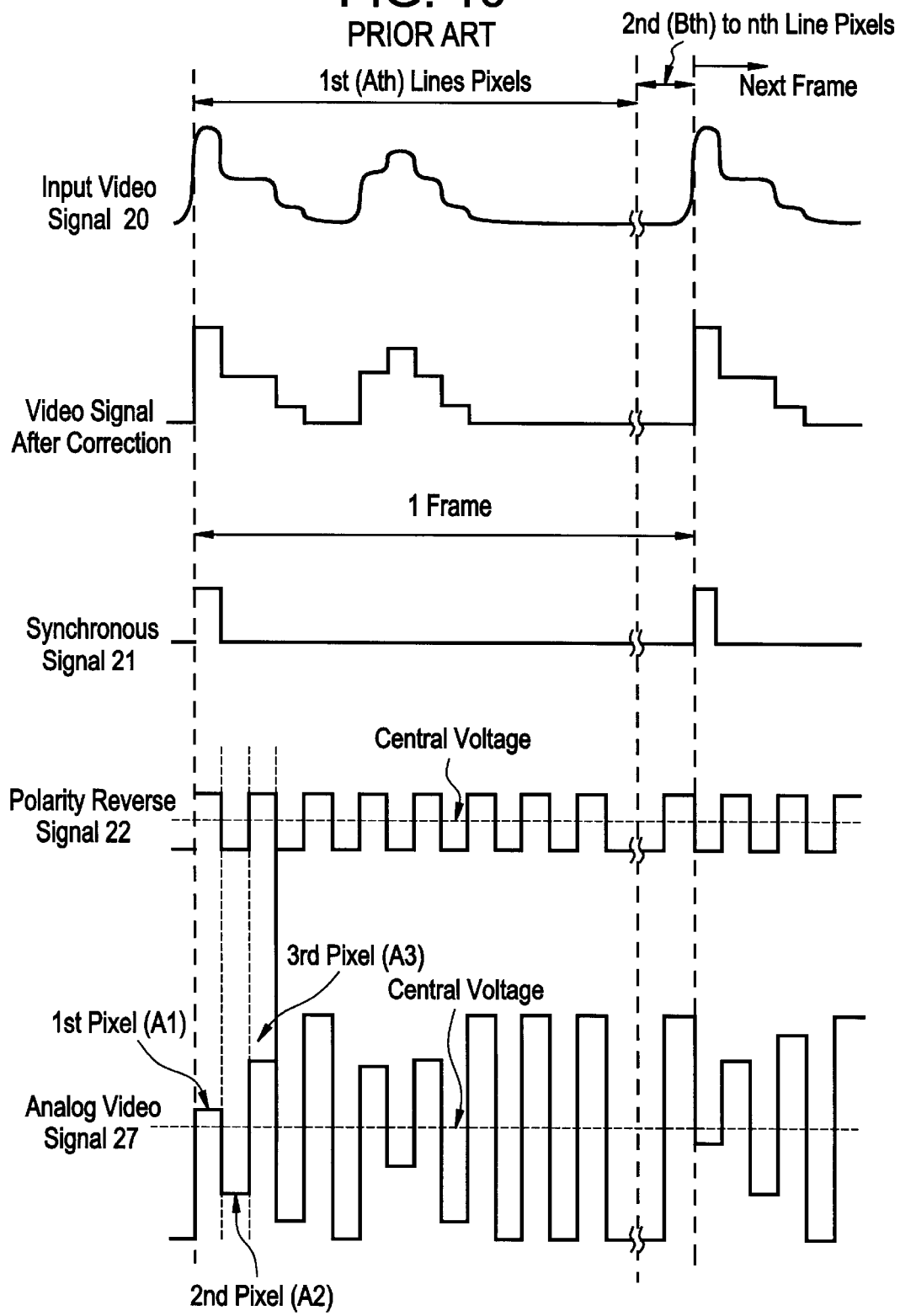

Display pattern

| A1 | A2 | A3 | A4 | A5 | A6 |
|----|----|----|----|----|----|
| B1 | B2 | B3 | B4 | B5 | B6 |
| C1 | C2 | C3 | C4 | C5 | C6 |
| D1 | D2 | D3 | D4 | D5 | D6 |
| E1 | E2 | E3 | E4 | E5 | E6 |
| F1 | F2 | F3 | F4 | F5 | F6 |

| + | - | + | - | + | - |
|---|---|---|---|---|---|
| + | - | + | - | + | - |
| + | - | + | - | + | - |
| + | - | + | - | + | - |
| + | - | + | - | + | - |
| + | - | + | - | + | - |

| - | + | - | + | - | + |
|---|---|---|---|---|---|
| - | + | - | + | - | + |
| - | + | - | + | - | + |
| - | + | - | + | - | + |
| - | + | - | + | - | + |
| - | + | - | + | - | + |

Display Pattern at Each Frame
Frame Inversion

Gate Line Inversion

Dot Inversion

PICTURE DISPLAY DEVICE AND METHOD OF DRIVING THE SAME

BACKGROUND OF THE INVENTION

1. Field of the Invention

The present invention relates to a driving method suitable for an active matrix type display which uses a display medium such as a liquid crystal and has a built-in driving circuit, and particularly to an alternating drive method of a liquid crystal panel.

2. Description of the Related Art

FIG. 7 is a block diagram of a conventional liquid crystal display device.

A liquid crystal panel 1 includes a plurality of scanning lines 2 extending in parallel with each other in the horizontal direction, a plurality of signal lines 3 extending in parallel with each other in the vertical direction intersecting the scanning lines at right angles, TFTs (thin film transistors) disposed near the intersecting portions of the scanning lines and the signal lines, and pixel electrodes connected to the TFTs. One end of each of the scanning lines 2 is connected to a gate electrode of each of the TFTs and the other end thereof is connected to a gate driver circuit 4 (scanning line drive circuit). One end of each of the signal lines 3 is connected to a source electrode of each of the TFTs and the other end thereof is connected to a source driver circuit 5 (signal line drive circuit).

A video signal from a signal processing circuit 6, and a start pulse signal, a clock signal, a horizontal synchronizing signal, etc. from a control circuit 7 are inputted to the source driver circuit 5.

The signal processing circuit 6 includes an analog/digital (A/D) conversion circuit 14, a correcting circuit 8, a digital/analog (D/A) conversion circuit 9, a reversal process circuit 10, and the like.

The control circuit 7 is a circuit for forming, on the basis of a video signal, pulses (start pulse, clock pulse, synchronizing signal, polarity reversal signal, etc.) necessary for the gate driver circuit 4, the source driver circuit 5, the signal processing circuit 6, and the like and for outputting the pulses.

The operation of the conventional liquid crystal display device structured as described above will be described.

First, while using an inputted synchronizing signal as a reference, the control circuit 7 repeats an operation (frequency division) of counting a predetermined count number (frequency division ratio) of clocks, with an oscillation clock signal (OSC) outputted from a phase synchronized oscillator as a basic oscillation. The control circuit 7 counts the clocks at the same time as the frequency division, and forms a start pulse 23 (SPD) in the screen horizontal direction, a start pulse 24 (SPS) in the screen vertical direction, a clock pulse 25 (CLD) in the screen horizontal direction, a clock pulse 26 (CLS) in the screen vertical direction, and a polarity reversal signal 22 (FRP). There is also a case where a horizontal synchronizing signal (HYS) and a vertical synchronizing signal (VSY) are formed. In this case, the HSY and the VSY are used as references in the horizontal and vertical directions when, for example, characters are displayed on the screen.

An input video signal 20 includes such signals that picture signals of one screen (frame) are divided by the number of lines in the longitudinal direction (vertical direction), and the signals the number of which is equal to the number of lines in the longitudinal direction are continuous. Data in one pixel unit, that is, respective data of red (R), green (G), and blue (B) are made one set and are transmitted every unit time to an input video signal line.

Correspondingly to the input video signal 20, in a pixel region 11, pixels of R, G, and B corresponding to different three colors of red, green, and blue are sequentially repeatedly arranged in the lateral direction (horizontal direction) of the panel to make up a pixel row, and a pixel column is made up in the longitudinal direction (vertical direction). For example, if the pixel region 11 is made up of 640 pixels in the horizontal and 400 pixels in the vertical, a video signal of one screen includes such signals that lines in the horizontal direction, each including information signals of 640 pixels in the horizontal, are continuous by the number (400 columns) of lines in the vertical direction. In general, the input video signal is a signal corresponding to a CRT, and is not a signal suitable for liquid crystal panel display, so that it is necessary to carry out various signal processes.

In the signal processing circuit 6, a γ correcting process in view of liquid crystal characteristics, an analog/digital signal (A/D) converting process, a digital/analog signal (D/A) converting process, an alternating process to improve the reliability of liquid crystal, and the like are performed to the input video signal from an external device.

In this signal processing circuit 6, for the purpose of obtaining excellent display, various corrections are carried out to the input video signal inputted from the outside. For the corrections, analog RGB signals are first converted into digital RGB signals by the analog/digital signal (A/D) conversion circuit 14. The γ correcting process in view of the liquid crystal characteristics and the like are performed to the video signal converted into digital signals and corrections are made. The corrected video signals are again converted into analog RGB signals by the digital/analog signal (D/A) conversion circuit 9.

Next, by the reversal process circuit 10, the video signals are subjected to the alternating process and the like to improve the reliability of liquid crystal. A polarity reversal signal 22 (FRP) as a signal to determine the timing for carrying out polarity reversal necessary for driving the liquid crystal panel is inputted to the reversal process circuit 10 from the control circuit 7. The reversal process circuit 10 is a circuit for inverting the video signal in accordance with the polarity reversal signal 22 (FRP).

In this way, the signal processing circuit 6 processes the input video signal 20 into an analog video signal 27 suitable for display of the liquid crystal panel. This video signal (subjected to the γ correction, alternating process, and the like) is inputted to the liquid crystal panel 1.

Next, this video signal 27, the SPD 23 formed in the control circuit 7, and the CLD 25 are inputted to the source driver circuit 5 provided in the liquid crystal panel 1. The SPD 23 is a signal regulating the timing in one horizontal period when display is started. The CLD 25 is a signal corresponding to the respective pixels in the horizontal direction, and in accordance with this signal, the source driver circuit samples the video signal from the signal processing circuit and outputs a voltage (video signal) corresponding to the respective pixels to the signal line 3. FIG. 9 is a timing chart in the source driver circuit.

The SPS 24 and the CLS 26 formed in the control circuit 7 are inputted to the gate driver circuit 4. The SPS 24 is a signal regulating the timing in one vertical period when display is started. The CLS 26 is a signal corresponding to the respective pixels in the vertical direction, and it is designed such that in accordance with this signal, scanning is carried out every one horizontal period from the upper portion of the screen and the screen is displayed.

The design of displaying the screen will be described in detail with reference to FIGS. 8A and 8B.

First, in accordance with a signal from a shift register, with respect to the signal line (1), only one portion (pixel A1) of a lateral direction (horizontal direction) line of the video signal 27 is selected and sampled, and its potential is applied to the entire of the signal line (1). A signal voltage (turning on a TFT provided in the vicinity of an intersecting portion) is applied to only a scanning line A. Then, only the TFT provided in the vicinity of the intersecting portion of the signal line (1) and the scanning line A is turned on and the potential of the signal line (1) is applied to the pixel A1. In this way, part of picture image information is written in the pixel A1.

Next, while the state where the pixel A1 has been written is held by auxiliary capacitance or the like, at a next instance, only one portion (pixel A2) in the lateral direction (horizontal direction) line of the video signal is selected and sampled, and its potential is applied to a signal line (2) adjacent to the signal line (1). In this way, part of the picture image information is written also in the pixel A2 similarly to the pixel A1. This process is sequentially repeated, so that part of the picture image information is sequentially written in the first pixel line (A row) in the lateral direction. During this, the signal turning on the TFT provided in the vicinity of the intersecting portion is applied to the scanning line A.

After writing in all of the first pixel row A in the lateral direction is ended, a signal voltage (turning on a TFT provided in the vicinity of an intersecting portion) is next applied to only a scanning line B. In the signal line (1), only one portion (pixel B1) of the video signal is sampled, and its potential is held. Similarly to the above, only pixel row (B row) corresponding to the second row in the lateral direction is sequentially written. Such operations are repeated n times, n being the number of pixel rows (n rows), so that one screen is displayed.

In general, in a liquid crystal display using TFTs, for the purpose of preventing deterioration of a liquid crystal material, eliminating display blur, and keeping display quality, voltages that the polarities of which are inverted every one frame or predetermined period are applied (alternated) to the respective pixels.

One of conventional typical alternating drive methods in a liquid crystal display panel will be described with reference to FIG. 10 and FIG. 11. Here, for simplification, an example is shown while using a model screen (FIG. 11A) of display pixels of 6 rows×6 columns as part of a display region.

First, the polarity reversal signal 22 (FRP) for inverting the polarity of the input video signal 20 is formed by the control circuit. The waveform of this polarity reversal signal 22 is shown in FIG. 10. On the basis of such polarity reversal signal (FRP), the polarity of the video signal is inverted. This video signal has a signal waveform in which the polarity is inverted from the positive to the negative or from the negative to the positive every one pixel.

Thus, the panel display as shown in FIG. 11B is obtained. The video signals having the same polarity (positive or negative) are applied to pixel electrodes denoted by A1, B1, C1, . . . , A3, B3, C3, . . . , and A5, B5, C5, . . . . Similarly, although the video signals having the same polarity (negative or positive) are applied to pixel electrodes denoted by A2, B2, C2, . . . , A4, B4, C4, . . . , and A6, B6, C6, . . . , the polarity is opposite to the pixel electrode A1. That is, the video signals having opposite polarities between adjacent pixels in the lateral (horizontal) direction are applied to the respective pixels. Besides, as shown in FIG. 11C, in the next screen (frame), the video signals having polarities opposite to the previous screen (frame) are applied to the respective pixels. By repeating this operation, alternating drive is carried out. Such an alternating method is called a source line inversion (or reversal), or a column inversion.

As other alternating drive methods of display of a liquid crystal display panel, as shown in a display pattern view of FIG. 12A, there is proposed an alternating method (frame reversal method) in which the polarity of a video signal is inverted at each time when one screen (frame) is written and the video signal is applied to the pixels.

However, in this method, a polarity reversal period is as long as one frame, and becomes a frequency region (about 30 Hz) which can be recognized by human eyes, so that an observer recognizes a subtle difference between the display where the polarity of the video signal is positive and the display where the polarity of the video signal is negative, as a flicker.

Moreover, as another alternating drive method to lower the flicker produced by the above frame reversal method, as shown in a display pattern view of FIG. 12B, there is proposed an alternating method (gate line reversal method) in which the polarity of a video signal is inverted every writing of adjacent one scanning line and the video signal is applied to the pixel. In this method, the video signals having opposite polarities between adjacent pixels in the longitudinal (vertical) direction are applied to the respective pixels. In this method, the polarity of the video signal is inverted from the positive to the negative or from the negative to the positive every one horizontal scanning period.

In addition, as an alternating drive method where it is hardest to produce a flicker, as shown in a display pattern view of FIG. 12C, there is proposed an alternating method (dot reversal method) in which the polarity of a video signal is inverted at each time of writing of adjacent all pixels and the video signal is applied to the pixel. In this method, a video signal having a polarity opposite to adjacent pixels in the lateral (horizontal) direction and the longitudinal (vertical) direction is applied to the respective pixels. Also in this method, like the source line reversal, the polarity of the video signal is inverted from the positive to the negative or from the negative to the positive every one pixel. However, this alternating drive method can not be applied to all cases, and it has been impossible to carry out this method in interlace drive which is the main current at present, for example, in a two-line simultaneous writing method.

Like this, in the conventional alternating methods, as shown in FIG. 10, in order to invert the polarity of a video signal every one pixel or one horizontal period from the positive to the negative or from the negative to the positive, it is necessary to newly charge the capacitance of the video signal line every one pixel or every one horizontal scanning period, so that its consumed electric power is large.

Moreover, in the conventional structure, there are problems that if the polarity reversal period of the video signal is long, lowering (color shift, flicker, etc.) of display characteristics occurs, and if the polarity reversal period of the video signal is short, a phase shift, a noise, dulling of a signal waveform, and the like occur and inaccurate alternating drive is caused.

The number of display pixels of a display increases year-by-year, and in a panel having a high number of pixels, a drive frequency becomes very high. For example, in the NTSC standard, it is necessary that the number of pixels is about 400 thousands, and in the HDTV standard, it is necessary that the number of pixels is about 2 millions.

Thus, the maximum frequency of an inputted video signal is about 6 MHz for the NTSC standard, and about 20 MHz to 30 MHz for the HDTV standard. In order to accurately display this video signal, it is necessary that the clock signal has a frequency (for example, about 50 MHz to 60 MHz) several times the video signal. In future, it is expected that fine and high quality display is still more required, and a video signal having a very fast dot clock comes to be processed.

Conventionally, it has been difficult to drive a liquid crystal panel while accurately alternating a video signal and a clock signal having such a high frequency band region. And also, it has been very difficult to constitute a circuit operating at a high frequency band region by TFTs using, for example, amorphous silicon or polycrystalline silicon.

SUMMARY OF THE INVENTION

The present invention has been made to overcome the foregoing problems. An object of the present invention is therefore to provide excellent display by using an alternating method which can deal with an input video signal with a relatively high picture quality, and further to provide a liquid crystal display device in which consumed electric power is decreased.

In order to achieve the object, according to a first aspect of the present invention, a method of driving a picture display device which comprises a liquid crystal panel including a switching element for each of pixel electrodes, a scanning line drive circuit for driving scanning lines of the liquid crystal panel, a signal line drive circuit for driving signal lines of the liquid crystal panel, a control circuit for controlling drive of the liquid crystal panel, and a signal processing circuit, is characterized in that the signal processing circuit outputs a pair of video signals having a reversal relationship with each other to the signal line drive circuit.

According to a second aspect of the present invention, a method of driving a picture display device which comprises a liquid crystal panel including a switching element for each of pixel electrodes, a scanning line drive circuit for driving scanning lines of the liquid crystal panel, a signal line drive circuit for driving signal lines of the liquid crystal panel, a control circuit for controlling drive of the liquid crystal panel, and a signal processing circuit, is characterized in that a pair of video signals having symmetry with reference to a potential of an opposite electrode provided opposite to the pixel electrode is inputted to the signal line drive circuit.

According to a third aspect of the present invention, a method of driving a picture display device which comprises a liquid crystal panel including a switching element for each of pixel electrodes, a scanning line drive circuit for driving scanning lines of the liquid crystal panel, a signal line drive circuit for driving signal lines of the liquid crystal panel, a control circuit for controlling drive of the liquid crystal panel, and a signal processing circuit, is characterized in that the signal processing circuit outputs plural pairs of video signals having reversal relationships with each other to the signal line drive circuit.

According to a fourth aspect of the present invention, a method of driving a picture display device which comprises a liquid crystal panel including a switching element for each of pixel electrodes, a scanning line drive circuit for driving scanning lines of the liquid crystal panel, a signal line drive circuit for driving signal lines of the liquid crystal panel, a control circuit for controlling drive of the liquid crystal panel, and a signal processing circuit, is characterized in that plural pairs of video signals, each pair having symmetry with reference to a potential of an opposite electrode provided opposite to the pixel electrode, is inputted to the signal line drive circuit.

According to a fifth aspect of the present invention, a method of driving a picture display device which comprises a liquid crystal panel including a switching element for each of pixel electrodes, a scanning line drive circuit for driving scanning lines of the liquid crystal panel, a signal line drive circuit for driving signal lines of the liquid crystal panel, a control circuit for controlling drive of the liquid crystal panel, and a signal processing circuit, is characterized in that the signal processing circuit outputs at least one first video signal and at least one second video signal to the signal line drive circuit, the first video signal is applied to an odd signal line of the signal lines, the second video signal is applied to an even signal line of the signal lines, polarities of signal potentials of the first video signal and the second video signal are inverted every one horizontal period, and the first video signal has a reversal relationship with the second video signal.

In the above structure, the method of driving a picture display device is characterized in that the signal line drive circuit and the scanning line drive circuit make driving in a lateral direction while inverting polarities of signal potentials of adjacent ones of the pixel electrodes with reference to a potential of an opposite electrode provided opposite to the pixel electrode, and further make driving while inverting a polarity of a signal potential of each of the pixel electrodes every frame period.

According to a sixth aspect of the present invention, a method of driving a picture display device which comprises a liquid crystal panel including a switching element for each of pixel electrodes, a scanning line drive circuit for driving scanning lines of the liquid crystal panel, a signal line drive circuit for driving signal lines of the liquid crystal panel, a control circuit for controlling drive of the liquid crystal panel, and a signal processing circuit, is characterized in that the signal processing circuit outputs at least one first video signal and at least one second video signal to the signal line drive circuit, the first video signal is applied to an odd signal line of the signal lines, the second video signal is applied to an even signal line of the signal lines, polarities of signal potentials of the first video signal and the second video signal are inverted every frame period, and the first video signal has a reversal relationship with the second video signal.

In the above structure, the method of driving a picture display device is characterized in that the signal line drive circuit and the scanning line drive circuit make driving in a lateral direction while inverting polarities of signal potentials of adjacent ones of the pixel electrodes with reference to a potential of an opposite electrode provided opposite to the pixel electrode, invert a polarity of a signal potential every pixel in a vertical direction, and further make driving while inverting a polarity of a signal potential of each of the pixel electrodes every frame period.

In the picture display device of each of the respective structures set forth above, liquid crystal is filled between two transparent insulating substrates, a plurality of scanning lines arranged in parallel on the inner surface of one of the substrates and a plurality of signal lines arranged in parallel are formed so as to intersect each other, pixel electrodes are formed in regions surrounded by the scanning lines and the signal lines, thin film transistors (TFT) are formed near the intersecting portions of the scanning lines and the signal lines, and an opposite electrode is formed on the inner surface of another substrates.

According to another aspect of the present invention, a picture display device is characterized in that the device is driven by any one of the methods of driving the picture display device set forth above.

According to a seventh aspect of the present invention, a picture display device comprises a liquid crystal panel including a switching element for each of pixel electrodes, a scanning line drive circuit for driving scanning lines of the liquid crystal panel, a signal line drive circuit for driving signal lines of the liquid crystal panel, a control circuit for controlling drive of the liquid crystal panel, and a signal processing circuit, and is characterized in that the signal processing circuit is connected to the liquid crystal panel through a plurality of video signal lines, and includes D/A conversion circuits connected to the plurality of video signal lines, the number of D/A conversion circuits being equal to the number of video signal lines.

The picture display device is particularly suitable for a projection type display means including a transmission type liquid crystal panel and a light source for projection.

BRIEF DESCRIPTION OF THE DRAWINGS

In the accompanying drawings:

FIG. 10 is a view showing signal voltage waveforms of a conventional method;

DETAILED DESCRIPTION OF THE INVENTION

Preferred embodiments of the present invention will be described below. The present invention is not limited to the embodiments.

Embodiment 1

Figure 1:
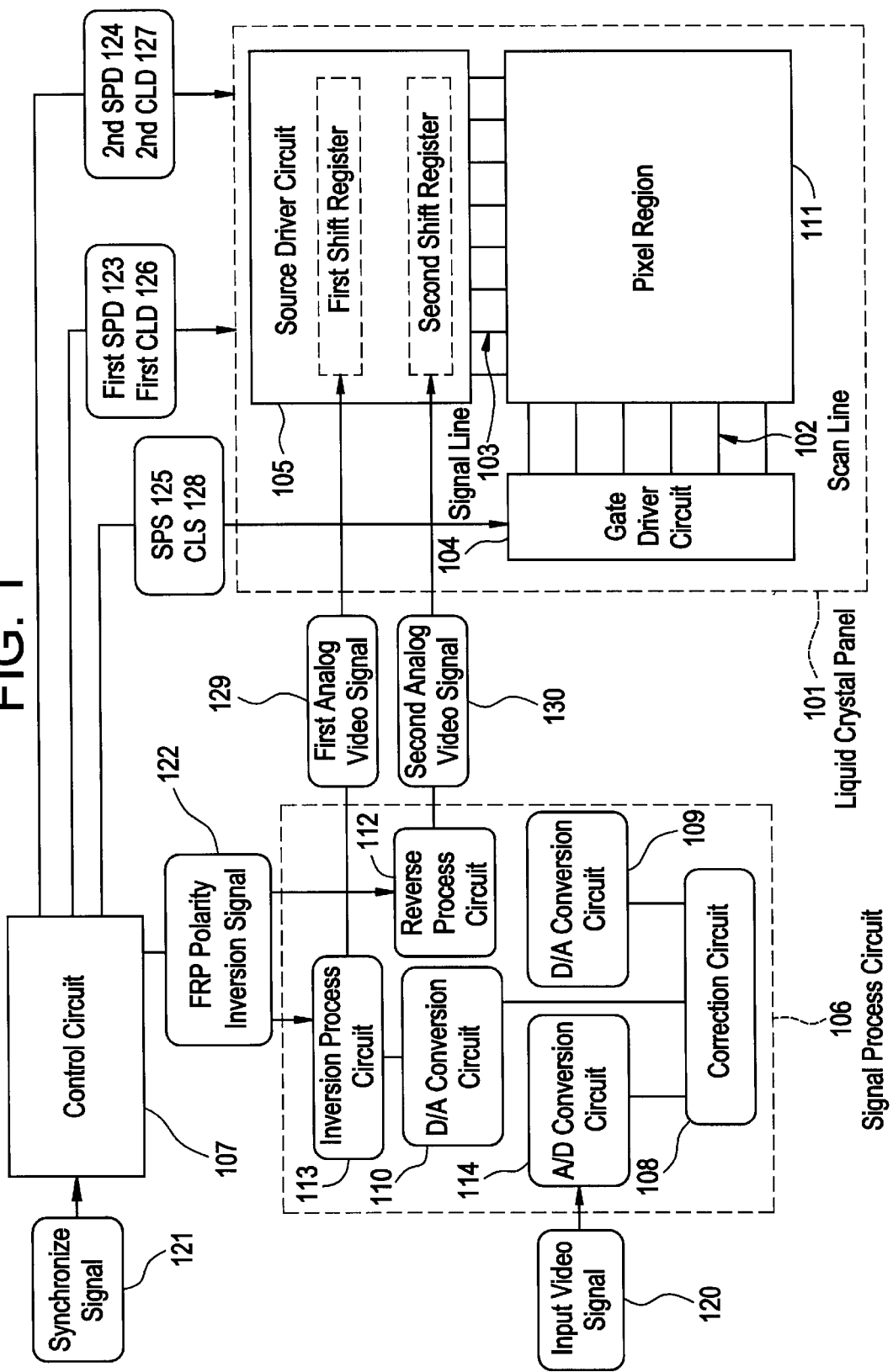
FIG. 1 is a block diagram showing an embodiment of the present invention.

FIG. 1 is a block diagram showing embodiment 1 of a liquid crystal display device of the present invention. FIG. 1 shows a liquid crystal display device mainly including a liquid crystal panel 101, a signal processing circuit 106, and a control circuit 107.

The signal processing circuit 106, the control circuit 107, and the like are mounted on, for example, a different printed circuit, and are connected to the liquid crystal panel 101 through a cable, a flexible wiring plate, or the like. It is possible to form part or all of peripheral circuits, such as the signal processing circuit 106 and the control circuit 107, on a same substrate as an active matrix substrate of the liquid crystal panel 101 by using thin film transistors, which may be formed simultaneously as the active matrix circuits.

The liquid crystal panel 101 mainly includes a plurality of scanning lines 102 extending in parallel with each other in a horizontal direction (lateral direction), a plurality of signal lines 103 extending in parallel with each other in a vertical direction (longitudinal direction) intersecting the scanning lines at right angles, TFTs (thin film transistors) disposed at the intersecting portions of the scanning lines and the signal lines, and pixel electrodes connected to the TFTs.

The TFT is used electrically as a switch, and is preferably formed by using a silicon film or the like having crystallinity as a semiconductor material. In this embodiment, although a film obtained by using a quartz substrate and by means a crystallizing method (for example, technique disclosed in Japanese Patent Unexamined Publication No. Hei. 9-312260, or the like) using nickel as a catalytic element is used as the silicon film having crystallinity, the silicon film is not particularly limited to this as long as the film has crystallinity and excellent mobility. Incidentally, Japanese Patent Unexamined Publication No. Hei. 9-312260 discloses also a gettering technique to lower the concentration of the catalytic element, and the present invention used the gettering technique as well. There is a pending U.S. patent application Ser. No. 08/785,489, which corresponds to this Japanese patent. The entire disclosure of these patents are incorporated herein by reference.

One end of each of the scanning lines 102 is connected to a gate electrode of each of the TFTs, and the other end thereof is connected to a gate driver circuit 104. One end of each of the signal lines 103 is connected to a source electrode of each of the TFTs and the other end thereof is connected to a source driver circuit 105.

In FIG. 1, although merely several signal lines 103 are shown, the number of signal lines are actually equal to the number of pixel electrodes of the liquid crystal panel in the lateral direction. Similarly, the number of scanning lines 102 is equal to the number of pixel electrodes of the liquid crystal panel in the longitudinal direction.

The pixel electrode connected to the TFT together with a counter electrode formed on the other substrate and liquid crystal constitute a liquid crystal capacitor. The counter electrode is connected to all liquid crystal capacitors, and has a common potential (center potential).

The control circuit 107 is a circuit for supplying, on the basis of an input video signal, pulses (start pulse, clock pulse, synchronizing signal, polarity reversal signal, etc.) necessary for the gate driver circuit (scanning line drive circuit) 104, the source driver circuit (signal line drive circuit) 105, the signal processing circuit 106, and the like.

Figure 4:
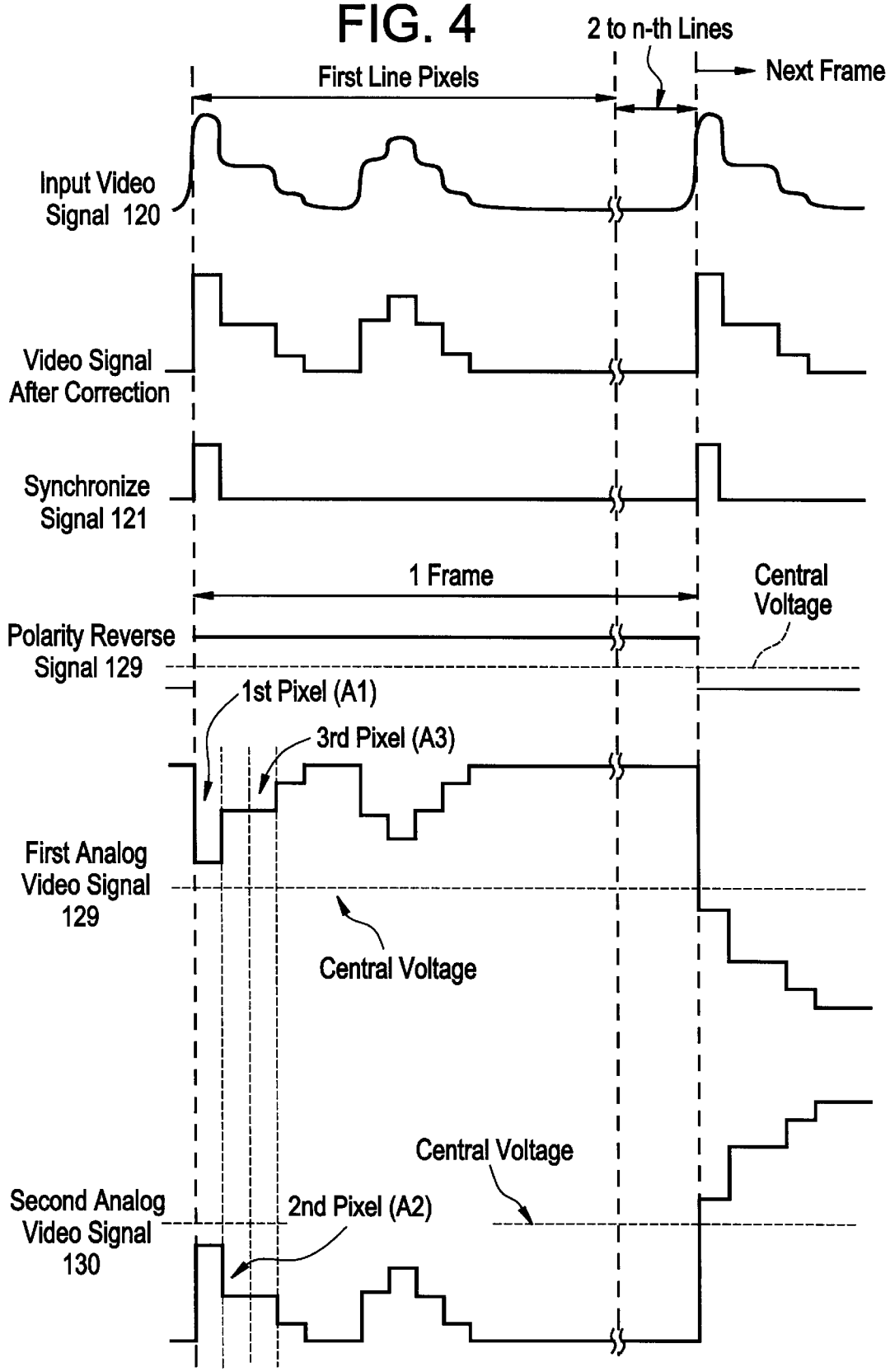
FIG. 4 is a view showing signal voltage waveforms showing an embodiment of the present invention.

In this embodiment, on the basis of an input video signal 120, a first analog video signal 129 and a second analog video signal 130 are outputted by the signal processing circuit 106 to the source driver circuit (signal line drive circuit) 105. FIG. 4 shows an example of signal waveforms of the input video signal 120, a video signal after correction, a synchronizing signal 121, a polarity reversal signal 122, a first analog video signal 129, and a second analog video signal 130. In FIG. 4, for simplification, ends of the respective signals are not provided. Besides, in the drawing, signals in second to n-th lines in one frame period are omitted.

The signal processing circuit 106 of this embodiment mainly includes an analog/digital (A/D) conversion circuit 114, a correcting circuit 108, digital/analog (D/A) conversion circuits 109 and 110, reversal process circuits 112 and 113, and the like. Although this embodiment uses the A/D conversion circuit 114 and the D/A conversion circuits 109 and 110 each having a general structure, such a structure may be adopted that the circuits are made up of TFTs and are provided on the same substrate as the panel.

The A/D conversion 114 is used to convert the input video signal 120 into a digital signal in which correction of a signal can be easily made. In this embodiment, although an example in which an analog RGB signal is used as the input video signal is shown, it is also possible to use a digital RGB signal as the input video signal. In the case where the digital RGB signal is used as the input video signal, the A/D conversion circuit 114 is not necessary for the structure of the present invention.

The correcting circuit 108 performs various corrections to the inputted video signal (digital signal) by an arithmetic process and the like. This correcting circuit mainly carries out a γ correction process and the like to the video signal, and converts the video signal into a signal suitable for the liquid crystal panel display. In this embodiment, processing of dividing the signal into two signals is also carried out in this correcting circuit. It is preferable that this correcting circuit is made to have such a structure as includes a storing circuit for temporarily storing an inputted signal, a signal delay circuit for correcting a phase shift caused by division of two signals, and the like.

Two signals outputted from the correcting circuit 108 to different signal lines are respectively converted into analog signals by the corresponding D/A conversion circuits 109 and 110. Here, in order to prevent a phase shift, signal lines (two), some D/A conversion circuits (two), and reversal process circuits (two) become necessary. However, if the caused phase shift is small and is within an allowable range, a D/A conversion circuit (one) and a reversal process circuit (one) may constitute the signal processing circuit.

The reversal process circuits 112 and 113 are mainly made up of amplifiers, amplify two signals to the intensity (−5 V to 5 V) suitable for the liquid crystal panel, and invert the signals on the basis of the polarity reversal signal 122 formed in the control circuit. In addition, the entire of either one of the signals is inverted, so that two signals (first analog video signal 129, second analog video signal 130) having symmetry are outputted.

The two signals obtained in this way are inputted to the source driver circuit. As compared with a case where one signal is inputted to the source driver circuit, it is also possible to reduce the operation frequency to a half.

Two video signals from the signal processing circuit 106, the start pulse signal, clock signal, horizontal synchronizing signal, and the like from the control circuit 107 are inputted into the source driver circuit 105.

The source driver circuit 105 is made up of horizontal shift registers of two phases which can control scanning directions, and a sampling circuit for sampling the picture signal to drive a pixel portion. The sampling circuit is made up of a plurality of switching TFTs and capacitors.

Figure 2:
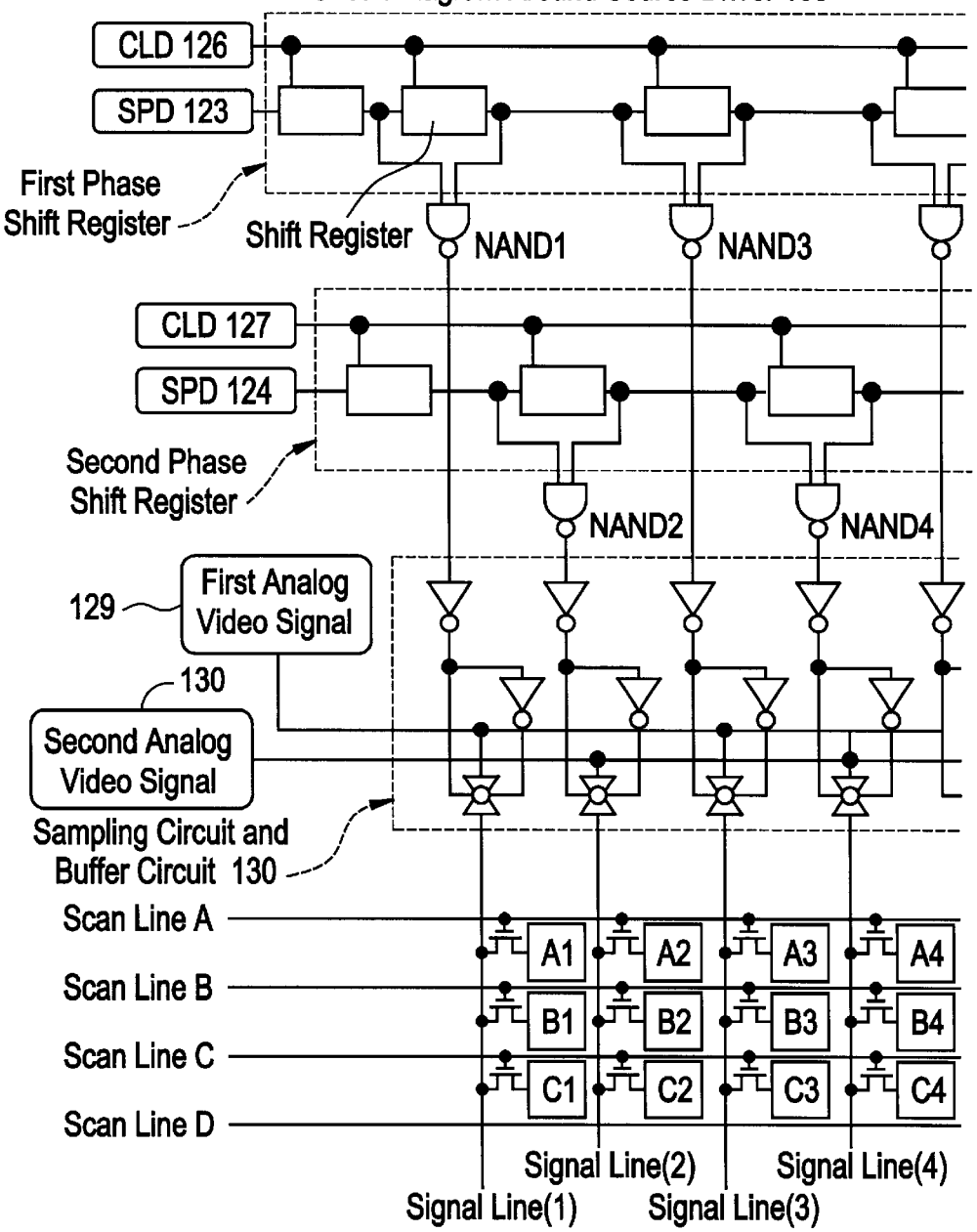
FIG. 2A is a partial circuit diagram of the periphery of a source driver circuit shown in FIG. 1.
FIG. 2B is a view showing a display pattern.

FIG. 2 is a circuit diagram showing the inner structure of the source driver circuit in the embodiment 1. The source driver circuit shown in FIG. 2 can be made up of various circuits, typically of a shift register, a level shifter, a switch, an inverter, an output buffer circuit, and the like. The circuit is not limited to the structure of this embodiment as long as the circuit samples the picture signal and applies it to a display portion.

Figure 3:
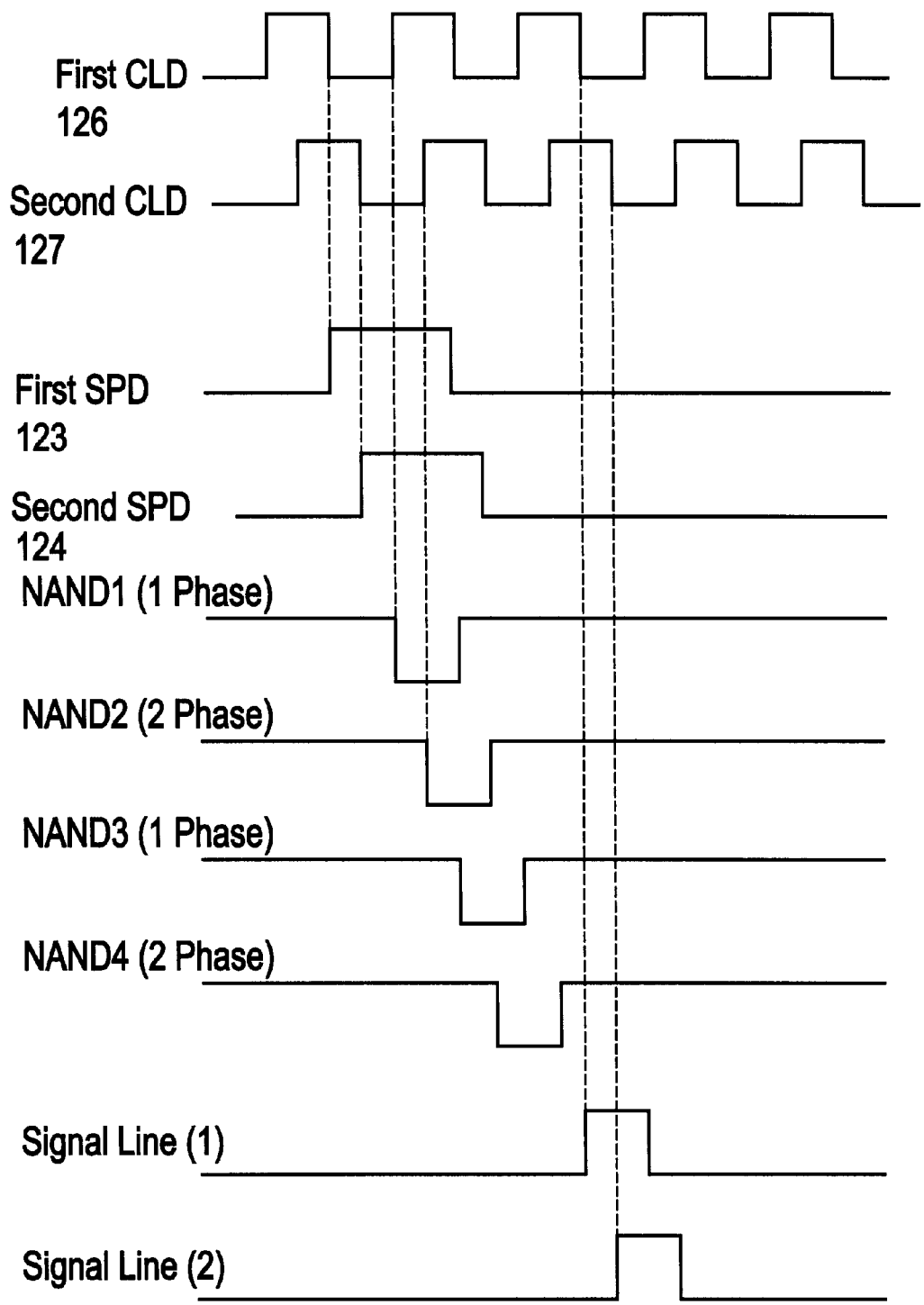
FIG. 3 is a timing chart of each of signals in a source driver circuit shown in FIG. 2.

In FIG. 2, although merely several signal lines are shown, the number of signal lines is actually equal to the number of pixel electrodes of the liquid crystal panel in the lateral direction. Similarly, the number of scanning lines is equal to the number of pixel electrodes of the liquid crystal panel in the longitudinal direction. FIG. 3 is a timing chart in this source driver circuit.

The gate driver circuit in the vertical direction includes a vertical shift register which can make control in the scanning direction, a level shifter for converting an output signal of the shift register into a voltage necessary for driving a pixel, an output buffer circuit, and the like.

The output buffer circuit in this embodiment is a circuit for amplifying a held voltage or converting impedance thereof and for applying it to the display portion, and various circuits including an inverter as a typical component are conceivable.

The alternating operation of this embodiment will be described below with reference to FIG. 4 showing an example of signal voltage waveform of the input video signal 120 of this embodiment.

First, the input video signal 120 is converted by the A/D conversion circuit 114 into a digital signal. Various corrections (liquid crystal display γ correction or camera γ correction, correction in conformity with demands by an observer, etc.) are performed by the correcting circuit 108, so that the signal is converted into a signal suitable for liquid crystal panel display. FIG. 4 shows the signal waveform at this time. In this embodiment, the video signal is divided into two signals which are outputted to separate signal lines. By this division, it is possible to lower the frequency of the video signal.

In this embodiment, although an example in which the analog video signal is divided into two signals, is shown, the signal may be divided into more than two signals in the present invention. If such a structure is adopted, it is possible to further lower the frequency of the video signal.

The two signals outputted from the correcting circuit 108 to the separate signal lines are converted into analog signals respectively by the corresponding D/A conversion circuits 109 and 110.

The voltages of the two analog signals are amplified respectively by amplifiers of the corresponding reversal process circuits to make signals having voltage values (about −5 V to about 5 V) suitable for panel driving. At this point of time, both the two signal voltages are within the voltage value range of 0 to 5 V. That is, the two signals have positive polarities with respect to the potential of the opposite electrode provided opposite to the pixel electrode as a center potential (reference potential). The polarity reversal signal 122 having polarities inverted every frame with the center potential as the reference is inputted to the two reversal process circuits as shown in FIG. 4. That is, in the two reversal process circuits, the video signals are amplified and at the same time, on the basis of the inputted polarity reversal signal, the polarities of the video signals are inverted every frame, with the center potential as the reference.

In this embodiment, although the reversal period of a drive voltage is made one frame period (one vertical scanning period), a period different from this may be made a reversal period. For example, the reversal period may be made a two-frame period or a three-frame period.

Figure 13:
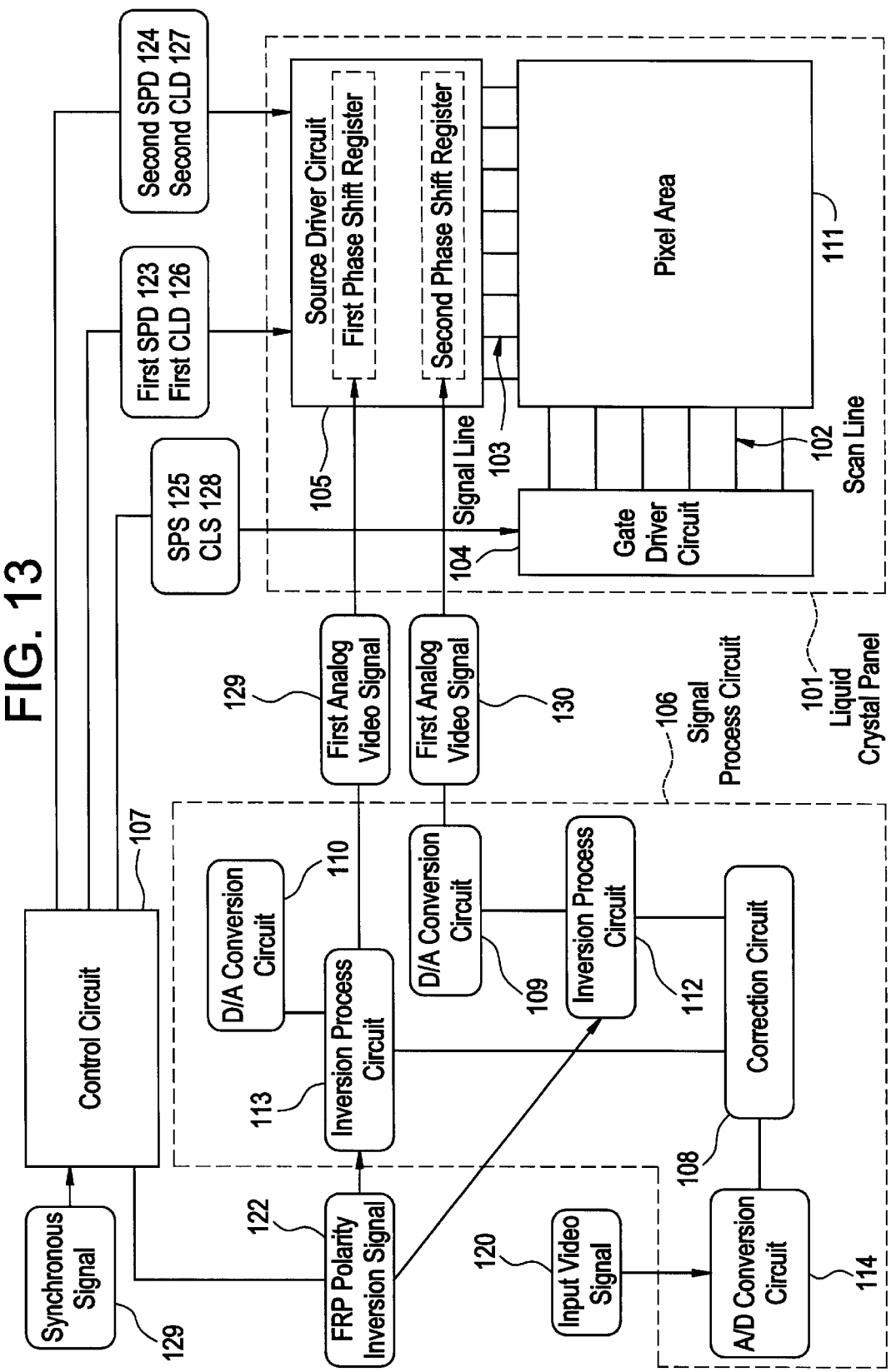
FIG. 13 is a block diagram showing an applied example of the present invention.

Further, in this reversal process circuit, either one of the video signals is inverted so that a pair of signals having symmetry are formed. As shown in FIG. 4, the waveforms of the pair of signals have symmetry with respect to the center potential, and become signal waveforms in which the polarities are inverted every screen. However, it is needless to say that the sequence of signal processes in the reversal process circuits 112 and 113 can be suitably changed by a circuit design. Moreover, as shown in FIG. 13 in which an example is shown, the sequence may be modified such that a digital signal is subjected to a reversal process, and the signal is converted into an analog signal. By doing so, a digital signal is processed to the utmost degree, so that it is possible to accurately process the signal. Like this, even in the signal processing circuit 106, it is possible to suitably change the sequence of signal processes in a similar manner.

The two signals (shown in FIG. 4) in which the polarities are inverted every screen and which have symmetry with reference to the potential of the opposite electrode provided opposite to the pixel electrode, are inputted to the source driver circuit 105.

Shift register portions of two phases are provided in the source driver circuit 105. A first start pulse signal and a first clock signal are inputted to the first phase horizontal shift register, and the first analog video signal 129 sampled by the sampling circuit is outputted to an odd signal line. A second start pulse signal and a second clock signal are inputted to the second phase horizontal shift register, and the second analog video signal 130 sampled by the sampling circuit is outputted to an even signal line.

In the case where the shift register portions of two phases are provided, as compared with a case where a shift register of only one line is used, the operation frequency of a shift register can be reduced to a half (½).

As an example of the present invention, a shift register of more than two phases may be used. For example, in the case where n-phase shifter registers are used, as compared with the case where a shift register of only one line is used, the operation frequency of the shift Here, the operation of the respective pixels in the case where the video signals of FIG. 4 (the first analog video signal 129, the second analog video signal 130) are applied, will be described with reference to FIG. 2 showing an example of a circuit diagram of the vicinity of the source driver circuit 105.

When a signal voltage (turning on a TFT provided in the vicinity of an intersecting portion) is applied to only a scanning line A, pixel TFTs are turned on, the first analog video signal 129 is applied to the signal line (1) synchronously with a scanning signal, and a positive signal is applied to a pixel electrode A1 connected to the odd signal line (1).

Next, in the same manner, the second analog video signal 130 is applied to the signal line (2) synchronously with a scanning signal, and a negative signal is applied to a pixel electrode A2 connected to the even signal line (2).

By repeating these operations, positive signals are sequentially applied to the pixel electrodes (A1, B1, C1, . . . and A3, B3, C3, . . . ) and negative signals are applied to the pixel electrodes (A2, B2, C2, . . . and A4, B4, C4, . . .).

After one frame period, when a signal voltage (turning on a TFT provided in the vicinity of an intersecting portion) is again applied to the scanning line A, since the polarities of the written first analog video signal 129 and the second analog video signal 130 are inverted as shown in FIG. 4, the polarity of a signal applied to a pixel electrode is inverted.

By repeating these operations, the amount of transmitting light is controlled in accordance with the video signal, and by the combination with other pixels, a picture is displayed on the entire of the liquid crystal panel.

In this way, source line reversal drive is carried out. In this embodiment, the alternating drive (source line reversal) can be carried out by using the video signal in which the polarity is inverted only every screen. That is, as compared with a conventional method in which the polarity is inverted every pixel or horizontal scanning period, a plurality of signals in which the number of polarity reversals in each signal is small (the polarity is inverted every screen) are used, and the source line reversal drive is carried out.

That is, since the number of polarity reversals is small, a phase shift or a noise is not easily produced, and consumed electric power can be reduced. Thus, as compared with the conventional method, it is possible to make picture display which is excellent in both horizontal resolution and vertical resolution and in which a flicker is not easily produced.

Embodiment 2

In the embodiment 1, the reversal period of the video signal is made one frame period, and the source line reversal drive is carried out. This embodiment shows an example in which although the structure of a device is the same as the embodiment 1, the reversal period of the video signal is made one horizontal period in the reversal process circuit, so that dot reversal drive is carried out.

In this embodiment, although the reversal period of a drive voltage is made one horizontal scanning line, a period different from this may be made a reversal period. For example, a two-horizontal scanning period or a three-horizontal scanning period may be adopted.

The dot reversal is an alternating drive method having a merit that a flicker is least noticeable since the polarities of voltages of video signals are inverted between adjacent pixels.

Figure 12A:
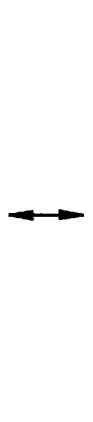
FIGS. 12A to 12C are views showing polarities of respective pixels in various reversal drive methods.
Figure 12B:
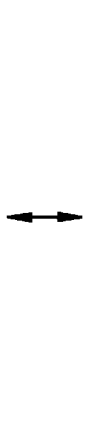
Figure 12C:

The feature of the dot reversal drive is that as shown in FIG. 12C, in one frame, the polarities of voltages of applied video signals are inverted between adjacent pixel electrodes in the vertical direction and the horizontal direction, and in the next frame, the polarities of the respective pixels are inverted.

In the conventional method, in order to perform the dot reversal, it is necessary to carry out polarity reversal every pixel. However, if the device structure similar to the embodiment 1 is used, and a plurality of video signals in each of which the polarity is inverted every horizontal scanning period (which have reversal relationships with each other) are inputted to the panel, the dot reversal drive can be made.

That is, in this embodiment, as compared with the conventional method in which the polarity is inverted every pixel, the dot reversal drive is carried out by using the video signal in which the number of polarity reversals is small (the polarity is inverted every horizontal scanning period), so that accurate alternating drive can be carried out, and the reliability of the panel can be improved.

Thus, in this embodiment, as compared with the embodiment 1, it is possible to obtain display with less flicker, high quality, and high fineness. Moreover, similarly to the embodiment 1, as compared with the conventional method, the consumed power can be greatly reduced.

Embodiment 3

Although the embodiments 1 and 2 show examples in which shift registers of two phases are used, in this embodiment, an applied example in which a one-phase shift register is used will be described. FIG. 5A is a schematic view of the vicinity of a source driver circuit of this embodiment.

Figure 5:
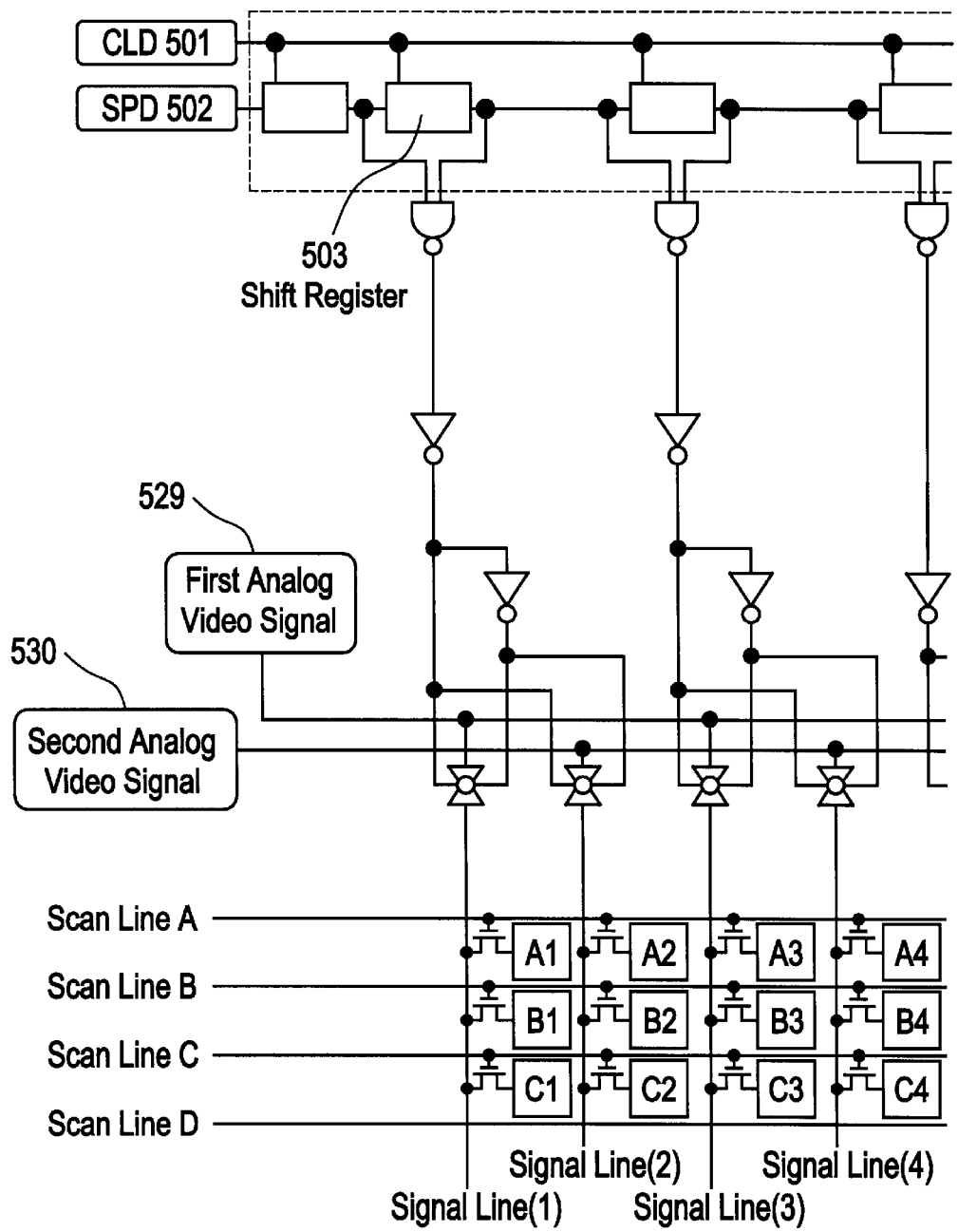
FIG. 5A is a partial circuit diagram of the periphery of a source driver circuit shown in embodiment 3.
FIG. 5B is a view showing a display pattern.

In FIG. 5A, reference numeral 501 denotes a clock signal, 502 denotes a start pulse, 503 denotes a shift register, 529 denotes a first analog video signal, and 530 denotes a second analog video signal. By using the video signal (polarity reversal period is one frame or one horizontal scanning period) as shown in the embodiment 1 or 2, it is possible to make the source line reversal or dot reversal drive even by the source driver circuit of FIG. 5. By making such a structure, it is possible to make integration of drive circuits.

Embodiment 4

Figure 6:
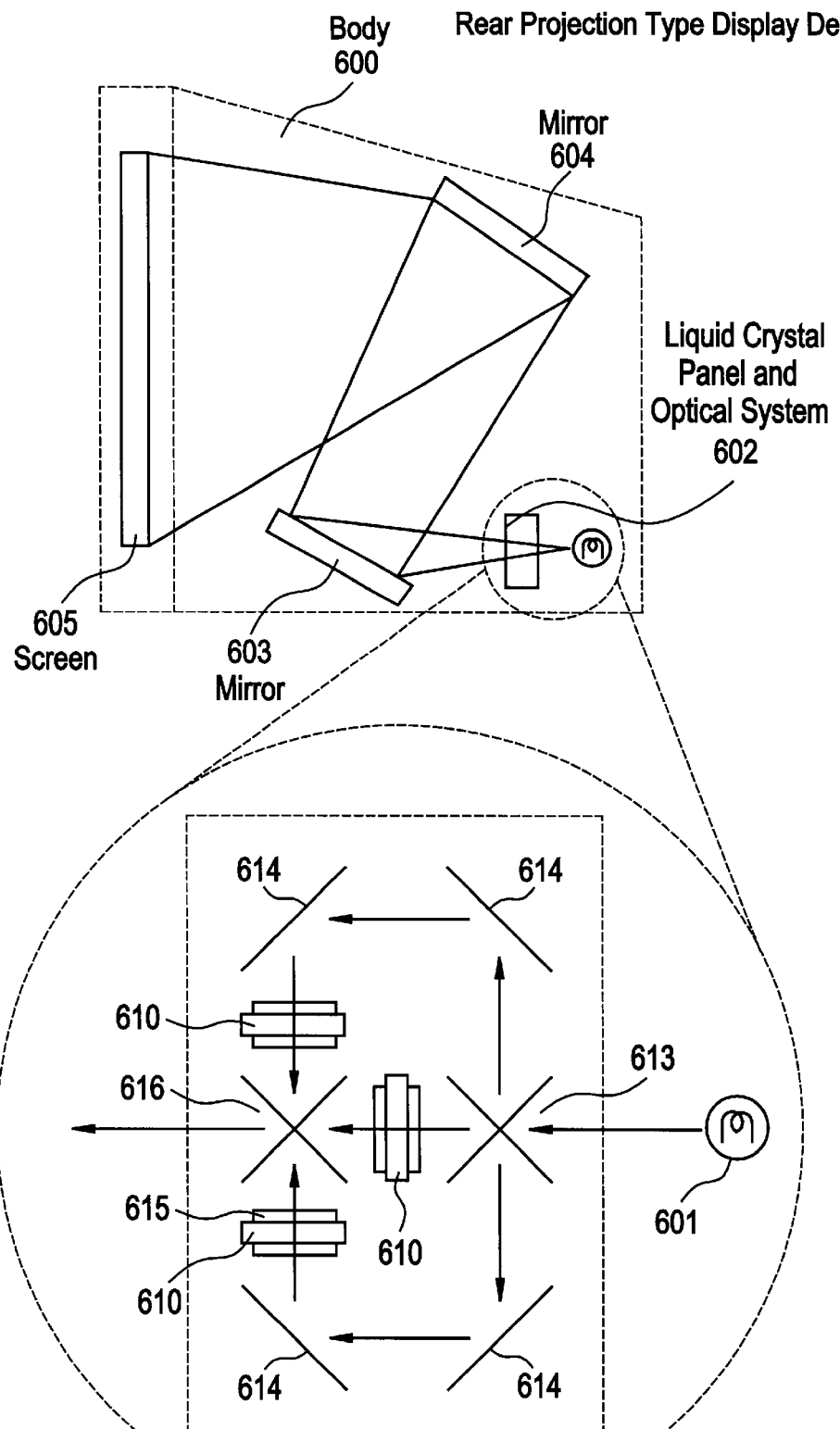
FIG. 6 is a view showing a schematic structure of a rear projector relating to the present invention.
Figure 7:
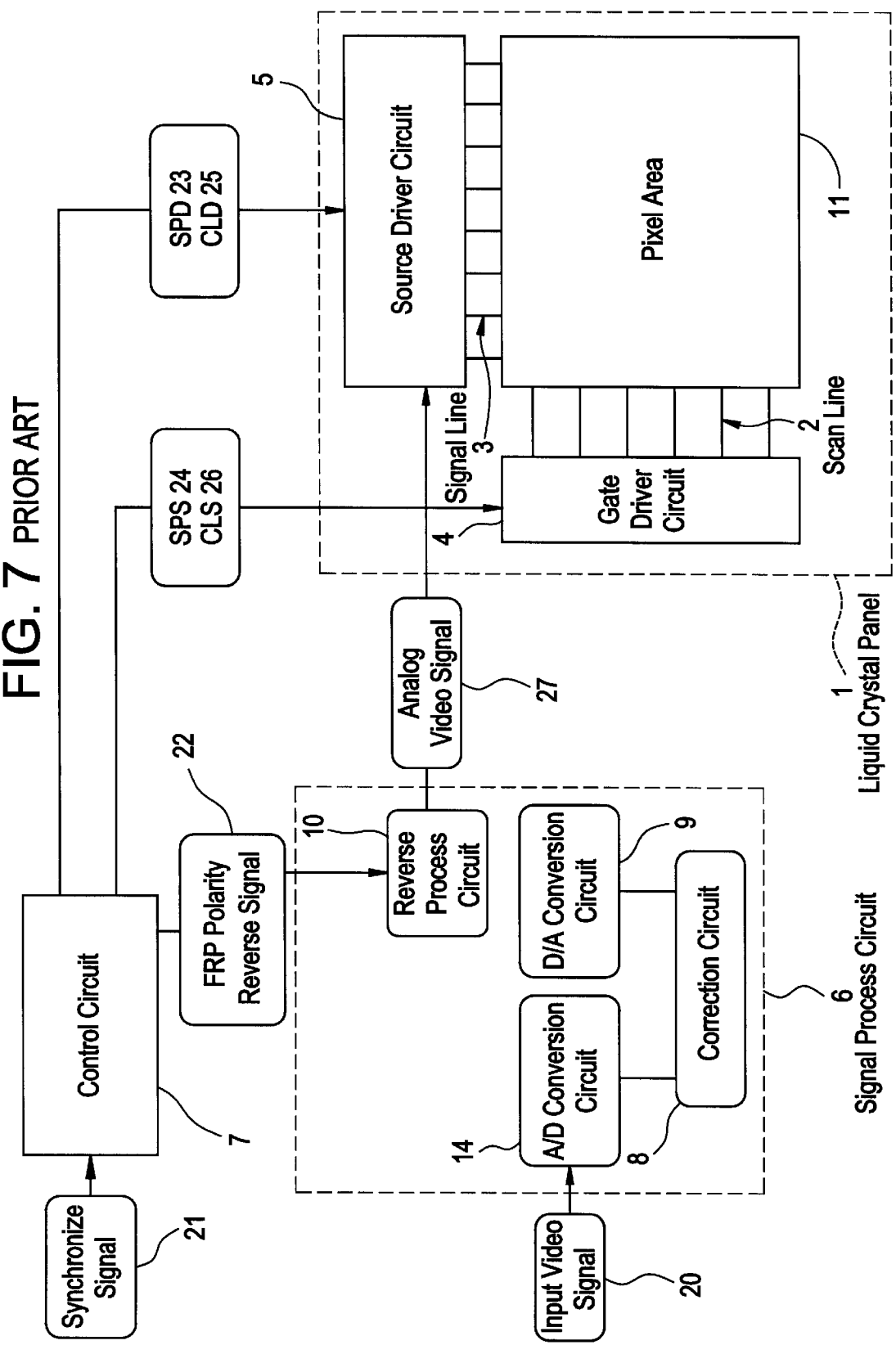
FIG. 7 is a block diagram showing a conventional liquid crystal display device.
Figure 8:
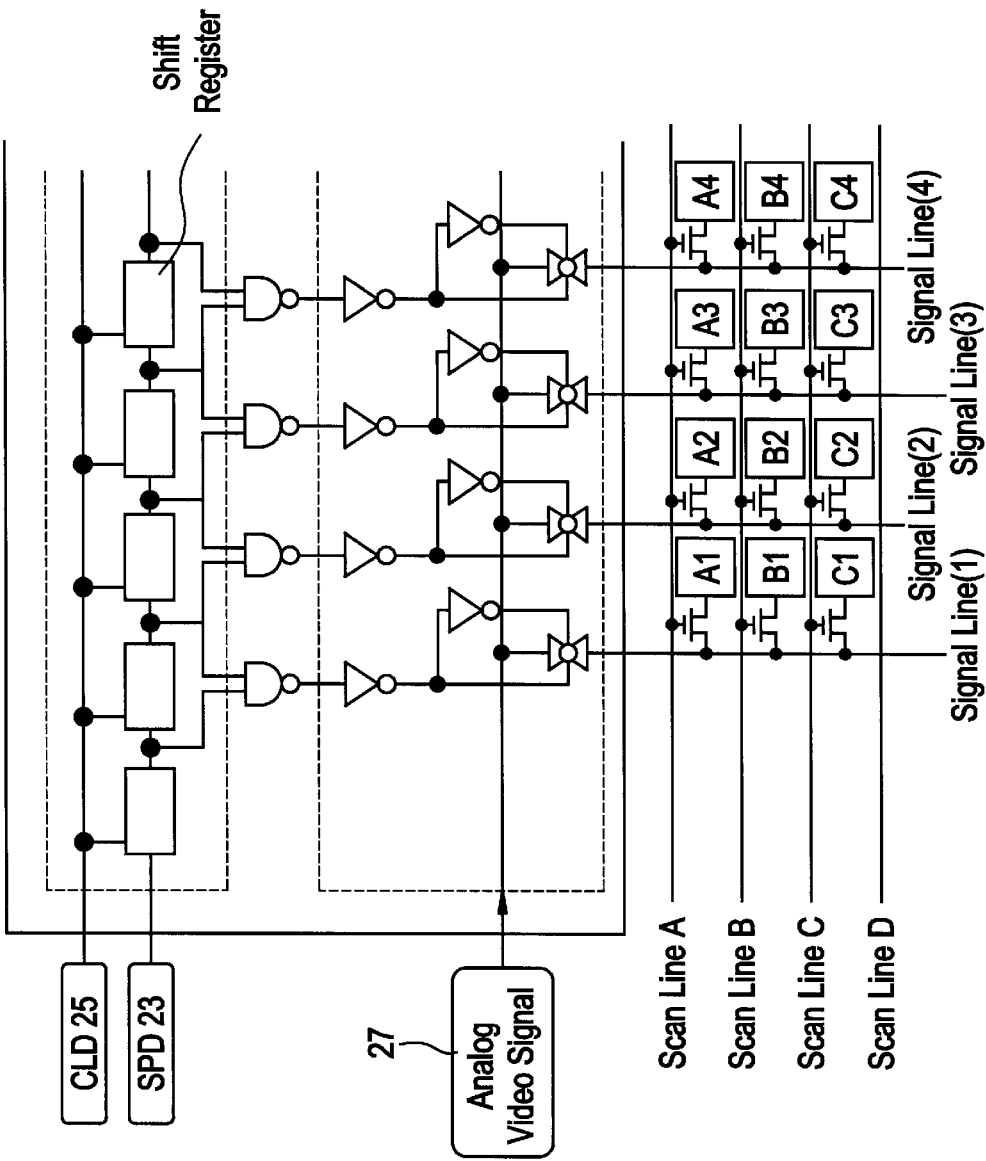
FIG. 8A is a partial circuit diagram of the periphery of a source driver circuit shown in FIG. 7.
FIG. 8B is a view showing a display pattern.
Figure 9:
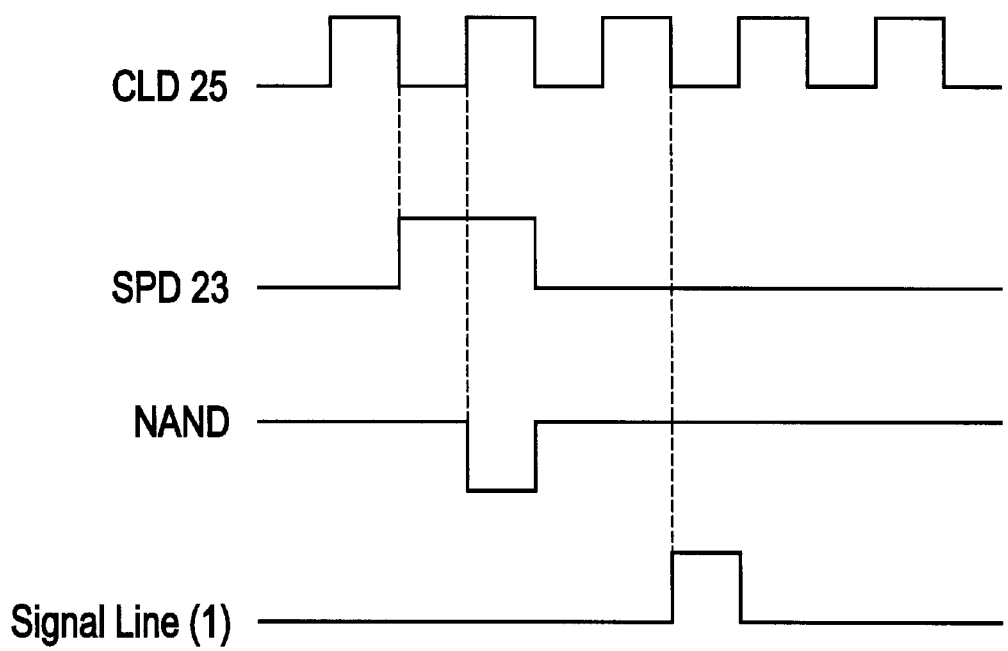
FIG. 9 is a timing chart of each of signals in a source driver circuit shown in FIG. 8.
Figures 11A, 11B, 11C:
FIGS. 11A to 11C are views showing polarities of respective pixels in source line reversal drive.

FIG. 6 is a view showing the outline of a projection type picture display device (rear projector) using a three-plate type optical system. In the projector (main body 600) of this embodiment, projection light projected from a light source 601 is separated into three primary colors of R, G, and B by an optical system 613, and light rays of the respective colors are guided by mirrors 614 to three TFT liquid crystal panels 610 displaying pictures of the respective colors. Light rays modulated by the respective TFT liquid crystal panels are synthesized by an optical system 616 and a color picture is projected on a screen 605. Reference numeral 615 denotes a polarizing plate.

When the input picture signals are supplied to the respective liquid crystal panels by using the liquid crystal panel, the signal processing circuit, and the control circuit of the present invention, it is possible to form the pictures of the respective colors, by the liquid crystal panels, with high quality and high resolution in which there is no cross talk, no mottling, no flicker, and no color blur. In addition, since the liquid crystal display γ correction or camera γ correction, correction suitable for human vision, correction in conformity of demands by an observer, and the like are performed by the correcting circuit, it is possible to obtain a picture having excellent γ characteristics.

Thus, by using this rear projector, a picture which is vivid and has high color reproducibility and high gradation, that is, a picture having excellent gradation expression can be displayed on a screen.

In the present invention, although the active matrix type panel is used as the liquid crystal panel, another liquid crystal panel with a different kind may be used.

The present invention can be applied not only to a drive circuit integration type liquid crystal display device, but also to a so-called external type display device in which a drive circuit is formed on a substrate different from a liquid crystal panel.

The structures of the circuits shown in the embodiment 1 to 4, for example, the structures of the shift register circuit, the buffer circuit, the sampling circuit, the memory circuit, and the like are merely an example, and it is needless to say that the structures can be suitably modified as long as similar functions can be obtained.

As described above, according to the alternating drive method and device structure of the present invention, the reversal period of a video signal when source line reversal drive display is carried out is greatly prolonged from a conventional one pixel writing period to one screen writing period, so that the present invention has effects that the consumed electric power of a signal processing circuit and a source driver circuit are reduced, and the consumed electric power of a liquid crystal display device can be reduced.

Similarly, even in the case where dot reversal drive display is carried out, the reversal period of a video signal can be greatly prolonged from a conventional one pixel writing period to one horizontal scanning writing period.

That is, when attention is paid to one video signal line, it is not necessary to invert the polarity of the video signal in one horizontal scanning line period, so that electric power necessary for charging capacitance of the video signal line is small, and further, as compared with the conventional method, a change in potential is small, so that a signal deterioration or a phase shift is small, and accurate picture information can be supplied to the respective pixels.

In addition, since the input video signal is divided into a plurality of video signals having reversal relationships with each other, the period of change of the video signal becomes long, and the frequency of the video signal can be reduced. Also in the source driver, it is possible to reduce the frequency of a clock signal by using shift registers of plural phases. Thus, since the frequency of the video signal having a relatively high frequency band region can be reduced, a sampling circuit and the like can be easily constituted by using TFTs, and it becomes possible to make display with high fineness constituted by video signals having a high frequency band region, which are conventionally difficult to be displayed.

According to the structure of the present invention, it is possible to make picture display with high fineness and high quality, which is excellent in horizontal resolution and vertical resolution and in which a flicker is not easily generated. That is, it is possible to obtain a picture having high gradation, that is, a picture having excellent gradation display.

What is claimed is:

1. A method of driving a picture display device which comprises a liquid crystal panel including a switching element for each of pixel electrodes; a scanning line drive circuit for driving scanning lines of the liquid crystal panel; a signal line drive circuit for driving signal lines of the liquid crystal panel; a control circuit for controlling drive of the liquid crystal panel; and a signal processing circuit, said method comprising the step of:

outputting with the signal processing circuit a pair of video signals having a reversal relationship with each other to the signal line drive circuit.

2. A method of driving a picture display device which comprises a liquid crystal panel including a switching element for each of pixel electrodes; a scanning line drive circuit for driving scanning lines of the liquid crystal panel; a signal line drive circuit for driving signal lines of the liquid crystal panel; a control circuit for controlling drive of the liquid crystal panel; and a signal processing circuit, said method comprising the step of:

inputting a pair of video signals having symmetry with reference to a potential of an opposite electrode provided opposite to the pixel electrodes to the signal line drive circuit.

3. A method of driving a picture display device which comprises a liquid crystal panel including a switching element for each of pixel electrodes; a scanning line drive circuit for driving scanning lines of the liquid crystal panel; a signal line drive circuit for driving signal lines of the liquid crystal panel; a control circuit for controlling drive of the liquid crystal panel; and a signal processing circuit, said method comprising the step of:

outputting with the signal processing circuit plural pairs of video signals having a reversal relationship with each other to the signal line drive circuit.

4. A method of driving a picture display device which comprises a liquid crystal panel including a switching element for each of pixel electrodes; a scanning line drive circuit for driving scanning lines of the liquid crystal panel; a signal line drive circuit for driving signal lines of the liquid crystal panel; a control circuit for controlling drive of the liquid crystal panel; and a signal processing circuit, said method comprising the step of:

inputting plural pairs of video signals, each having symmetry with reference to a potential of an opposite electrode provided opposite to the pixel electrodes to the signal line drive circuit.

5. A method of driving a picture display device which comprises a liquid crystal panel including a switching element for each of pixel electrodes; a scanning line drive circuit for driving scanning lines of the liquid crystal panel; a signal line drive circuit for driving signal lines of the liquid crystal panel; a control circuit for controlling drive of the liquid crystal panel; and a signal processing circuit, said method comprising the step of:

outputting with the signal processing circuit at least one first video signal and at least one second video signal to the signal line drive circuit;

applying the first video signal to an odd signal line of the signal lines;

applying the second video signal to an even signal line of the signal lines; and inverting polarities of signal potentials of the first video signal and the second video signal every frame period, wherein the first video signal output from the signal processing circuit has a reversal relationship with the second video signal output from the signal processing circuit.

6. A method of driving a picture display device according to claim 5, wherein the signal line drive circuit and the scanning line drive circuit make driving in a lateral direction while inverting polarities of signal potentials of adjacent ones of the pixel electrodes with reference to a potential of an opposite electrode provided opposite to the pixel electrode, and further make driving while inverting a polarity of a signal potential of each of the pixel electrodes every one frame period.

7. A method of driving a picture display device comprises a liquid crystal panel including a switching element for each of pixel electrodes; a scanning line drive circuit for driving scanning lines of the liquid crystal panel; a signal line drive circuit for driving signal lines of the liquid crystal panel; a control circuit for controlling drive of the liquid crystal panel; and a signal processing circuit, said method comprising the steps of:

outputting with the signal processing circuit at least one first video signal and at least one second video signal to the signal line drive circuit;

applying the first video signal to an odd signal line of the signal lines;

applying the second video signal to an even signal line of the signal lines; and inverting polarities of signal potentials of the first video signal and the second video signal every one horizontal period, wherein the first video signal output from the signal processing circuit has a reversal relationship with the second video signal output from the signal processing circuit.

8. A method of driving a picture display device according to claim 7, further comprising the steps of driving the signal line drive circuit and the scanning line drive circuit in a lateral direction while inverting polarities of signal potentials of adjacent ones of the pixel electrodes with reference to a potential of an opposite electrode provided opposite to the pixel electrodes, inverting a polarity of a signal potential every pixel in a vertical direction, and driving the signal line drive circuit and the scanning line drive circuit while inverting a polarity of a signal potential of each of the pixel electrodes every one horizontal period.

9. A picture display device comprising:

a liquid crystal panel including a switching element for each of pixel electrodes;

a scanning line drive circuit for driving scanning lines of the liquid crystal panel;

a signal line drive circuit for driving signal lines of the liquid crystal panel;

a control circuit for controlling drive of the liquid crystal panel; and a signal processing circuit, wherein the signal processing circuit includes a correction circuit and is connected to the liquid crystal panel through a plurality of video signal lines, and includes D/A conversion circuits connected to the plurality of video signal lines, the number of D/A conversion circuits being equal to the number of video signal lines, wherein said D/A conversion circuits are commonly connected to said correction circuit, and wherein a pair of video signals having a reversal relationship with each other is output from the signal processing circuit to the signal line drive circuit.

10. A picture display device according to claim 9, wherein the picture display device is a projection type display means including a transmission type liquid crystal panel and a light source for projection.

11. The device of claim 9 wherein said correction circuit carries out a gamma correction process.

12. A method of driving a display device comprising the steps of:

preparing an original video signal;

modifying said original video signal to a pair of video signals having a reversal relation to each other;

inputting said pair of video signals to a source driver circuit;

selecting said pair of video signals by said source driver circuit; and applying the selected video signals to signal lines of a pixel region.

13. The method according to claim 12, herein said pair of video signals have opposite polarities to each other with respect to a reference voltage.

14. A display device comprising:

a pixel region having a plurality of signal lines and a plurality of scanning lines;

a scanning line drive circuit for driving scanning lines of the liquid crystal panel;

a source driver circuit for driving said plurality of signal lines; and a signal processing circuit operationally connected to said source driver circuit, wherein a pair of video signals having a reversal relation to each other are prepared in said signal processing circuit and input to said source driver circuit.

15. The display device according to claim 14, wherein said source driver circuit comprises a shift register and a sampling circuit for selecting said pair of video signals.

16. The display device according to claim 14, wherein said pair of video signals have opposite polarities to each other with respect to a reference voltage.

17. A display device comprising:

a pixel region having a plurality of signal lines and a plurality of scanning lines;

a source driver circuit for driving said plurality of signal lines, said source driver circuit comprising a first phase shift register and a second phase shift register;

a signal processing circuit operationally connected to said source driver circuit through a first video signal line and a second video signal line, wherein said first video signal line is operationally connected to said first phase shift register and said second video signal line is operationally connected to said second phase shift register, wherein a pair of video signals having a reversal relation to each other are input to said source driver circuit through said first video signal line and said second video signal line.

18. The display device according to claim 17, wherein said pair of video signals have opposite polarities to each other with respect to a reference voltage.

* * * * *